United States Patent [19]

Romig, Jr.

[11] Patent Number: 4,856,623
[45] Date of Patent: Aug. 15, 1989

[54] OVERSPEED BRAKE

[76] Inventor: Byron A. Romig, Jr., 19400 San Jose Ave., City of Industry, Calif. 91748

[21] Appl. No.: 744,646

[22] Filed: Jun. 13, 1985

Related U.S. Application Data

[63] Continuation of Ser. No. 447,275, Dec. 6, 1982, abandoned.

[51] Int. Cl.⁴ .............................................. B60T 7/12
[52] U.S. Cl. .................................. 188/180; 188/71.5; 188/184; 188/187
[58] Field of Search ........................ 188/30, 72.1, 72.2, 188/72.7, 72.8, 73.2, 80, 82.1, 82.2, 82.3, 82.34, 82.4, 82.5, 82.7, 71.4, 82.74, 82.77, 82.9, 84, 136, 180, 181 R, 71.5, 181 A, 72.6, 184, 185, 186, 187, 189; 187/19, 73, 89; 192/84 PM, 105 CD

[56] References Cited

U.S. PATENT DOCUMENTS

| | | | |
|---|---|---|---|
| 2,494,443 | 1/1950 | Luehrs | 188/184 |
| 2,916,105 | 12/1959 | Dasse et al. | 188/71.5 |
| 3,143,125 | 8/1964 | Stelzer | 303/6 C X |
| 3,194,371 | 7/1965 | Rabinow | 192/84 PM |
| 3,415,343 | 12/1968 | Svensson | 188/184 |
| 4,095,681 | 6/1978 | David | 188/187 |
| 4,258,832 | 3/1981 | Thorp | 188/184 |

FOREIGN PATENT DOCUMENTS 656945  4/1979  U.S.S.R. ................. 187/89

Primary Examiner—Andres Kashnikow
Assistant Examiner—M. C. Graham
Attorney, Agent, or Firm—Pretty, Schroeder, Brueggemann & Clark

[57] ABSTRACT

An overspeed brake mounted on an elevator cage includes a shaft that carries a pinion engageable with a rack so that linear movement of the cage produces rotation of the shaft. A carrier rotated by the shaft has two pivotably mounted dogs thereon that move outwardly at a predetermined centrifugal force level to cause rotation of a separation ring. A spreader causes axial first separation between the first ring and a second separation ring in response to the rotation, forcing two brake surfaces together and stopping rotation of the shaft, thereby halting linear motion of the cage.

12 Claims, 4 Drawing Sheets

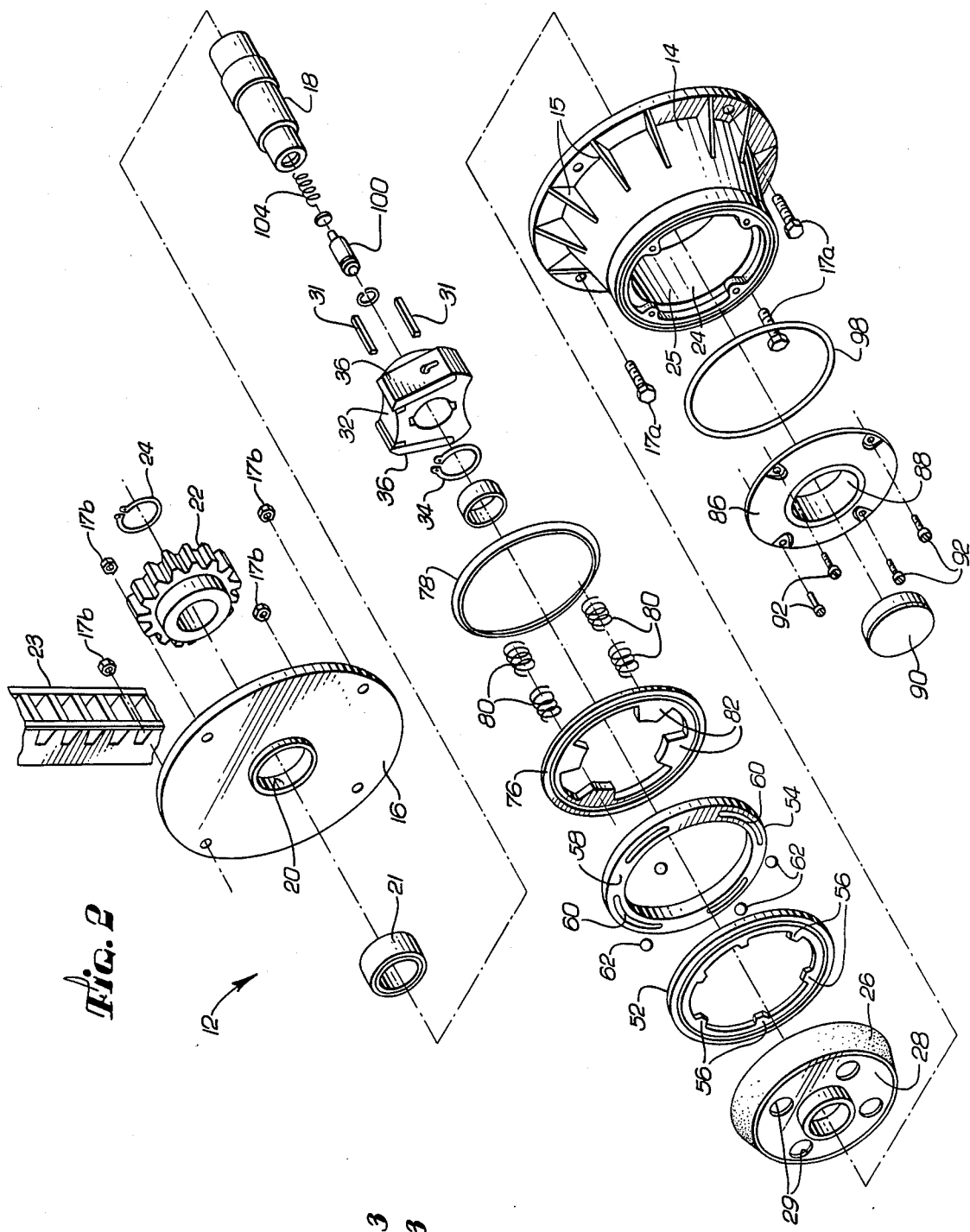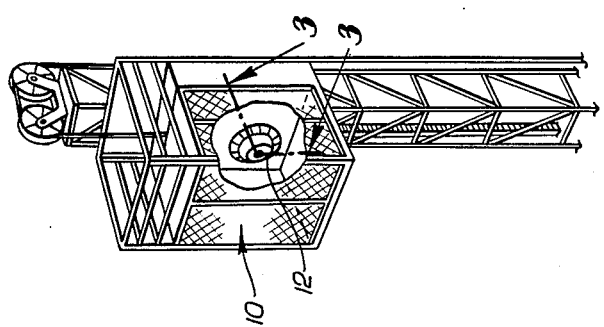

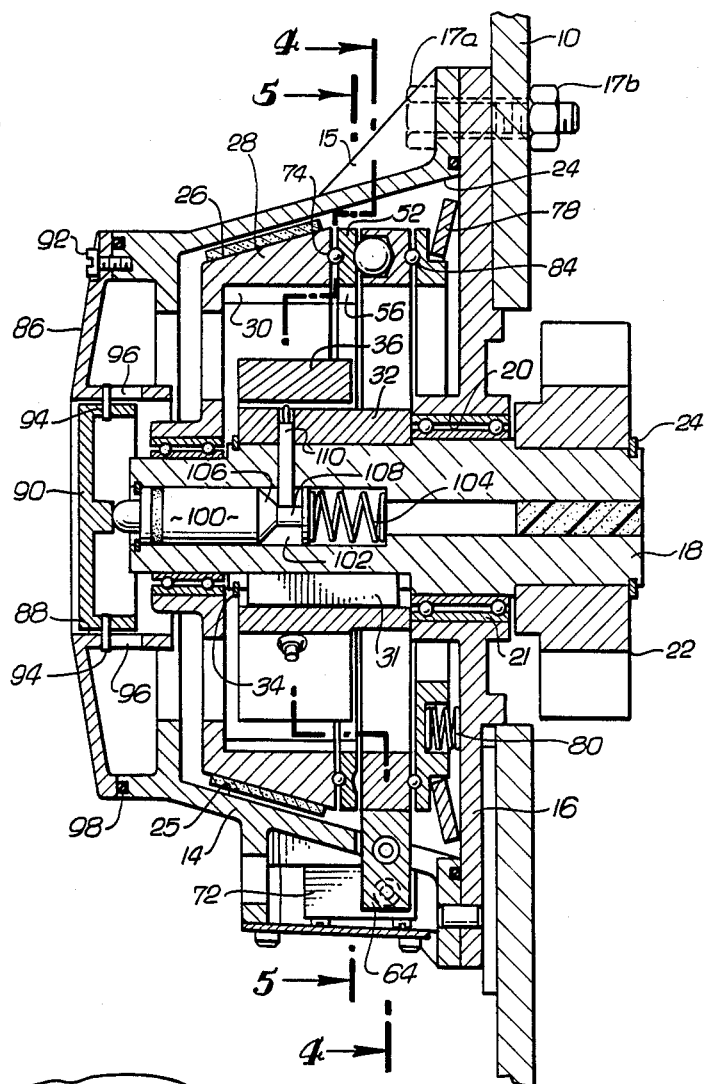

OVERSPEED BRAKE

This is a continuation of application Ser. No. 447,275, filed on Dec. 6, 1982, entitled OVERSPEED BRAKE and now abandoned.

FIELD OF THE INVENTION

The present invention relates to overspeed brakes for use on hoists, elevators and other apparatus.

BACKGROUND OF THE INVENTION

A variety of types of apparatus such as elevators, including temporary elevators and construction hoists, are conventionally equipped with overspeed brakes, the function of which is to serve as an emergency device that stops the apparatus if the linear speed exceeds a predetermined limit. If for example an elevator drive should fail, the overspeed brake prevents the cage from falling.

An elevator cage is commonly attached to a counter weight, thus raising the possibility that the cage could "fall" up as well as down. A brake used in this environment should therefore be bi-directional. Once actuated, the brake should not jam and should be easily released, preferably by reversing the direction of travel. It should also be possible for the operator to actuate the brake manually. Whether operated manually or automatically, the braking force should be applied gradually for minimum stress and reduced danger of injury. Once triggered, however, the braking force should be initiated without substantial delay.

The construction of the brake should be as simple and trouble free as possible, produce a large stopping force in comparison to its size and weight, and require minimum maintenance. It should be easily inspected without disassembly if possible and the stopping force should be readily adjustable.

SUMMARY OF THE INVENTION

An overspeed brake, in accordance with the present invention, includes a shaft, a rack and pinion or other mechanism for causing the shaft to rotate in response to linear movement, and a carrier that rotates with the shaft. At least one dog is mounted on the carrier and is radially moveable, preferably pivotably, in response to centrifugal force. Until a predetermined centrifugal force level is reached a restraining mechanism holds the dog against the carrier.

First and second separation elements are arranged to be separated axially by a spreader mechanism in response to relative rotation between the elements. This relative rotation is caused by a rotation mechanism upon engagement thereof by the dog. It is preferred to use two dogs, one of which is operable in response each direction of rotation of the shaft. An actuator mechanism includes two brake surfaces by which a braking force is applied to the shaft in response to separation of the elements.

Preferably, the separation elements are rings that are concentric with the shaft and the carrier. The spreader means can advantageously be a ball and race arrangement, the race being tapered circumferentially along one of the rings with the ball disposed between the rings.

The brake surfaces, which may be conical, can be formed on an interior surface of a housing and on an exterior surface of a bell member pressed against the housing by separation of the rings. The rotation means can be in the form of lugs extending inwardly from one of the rings. Lugs on the bell member can be used to lock that member to the shaft upon engagement by a dog. A spring can be used to cause constant mutual engagement of the brake surfaces.

The restraining means may, for example, include a spring or a magnet, preferably both. One function of the spring is to pull the dog back toward the carrier once the dog is released from the rotation mechanism.

According to another aspect of the invention, the brake can be operated by a manual override mechanism that includes an axially moveable plunger and at least one radially moveable rod. Movement of the plunger causes the rod to push a dog outwardly away from the carrier.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a fragmentary, pictorial view of the top portion of a temporary construction hoist showing a cage equipped with and an overspeed brake in accordance with the present invention;

FIG. 2 is a three dimensional, exploded view of most components of the brake;

FIG. 3 is a cross-sectional, side view of the brake in a non-actuated condition, the view being taken substantially along the line 3—3 of FIG. 1, the same line being indicated in FIG. 4.

FIG. 7 is a fragmentary, cross-sectional, front view taken along the line 4—4 and similar to FIG. 4 but showing the brake in an actuated condition;

DESCRIPTION OF THE PREFERRED EMBODIMENT

Figure 4:
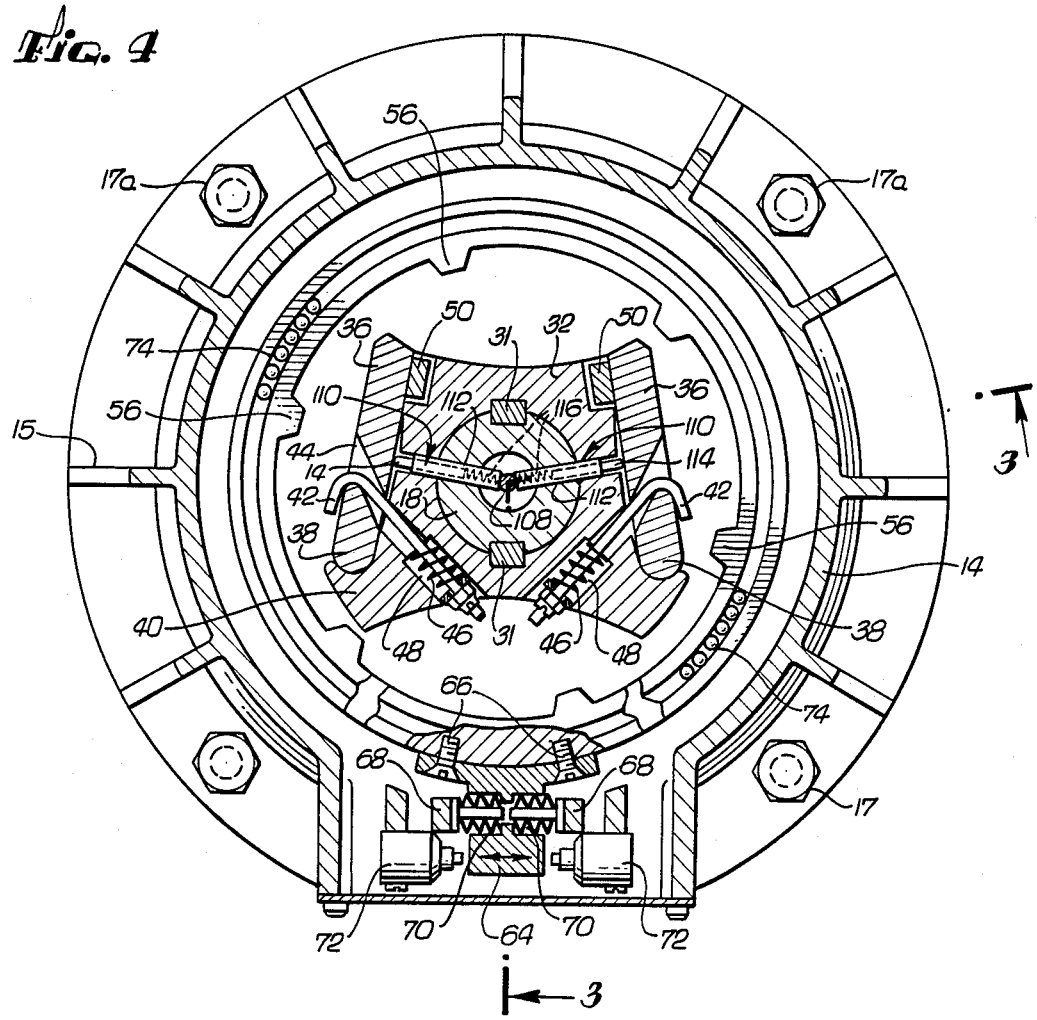
FIG. 4 is a cross-sectional, front view of the unactuated brake taken substantially along the line 4—4 of FIG. 3 and showing the ball and race mechanism.
Figure 5:
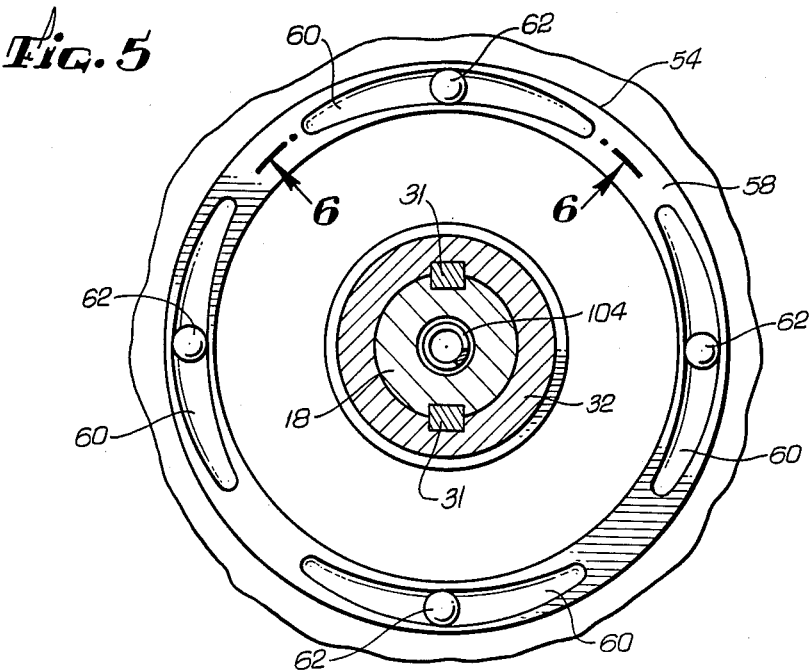
FIG. 5 is a fragmentary, cross-sectional, front view taken substantially along the line 5—5 of FIG. 3 and showing the ball and race mechanism.

An elevator cage 10, shown in FIG. 1, is of the type typically used for an external construction hoist. It is equipped with an overspeed brake 12, separately shown in FIGS. 2-8 and constructed in accordance with the present invention. The brake 12 includes a cast housing 14 that has a conical side wall which, in this embodiment, has fin-like buttresses 15. It is closed at the rear by a disk-like back plate 16 held in place by a plurality of bolts 17(a) and nuts 17(b). The housing 14 is securely mounted on the cage 10 in a non-rotatable manner.

A shaft 18 extends through a centered aperture 20 in the back plate 16, riding in a bearing 21, and carries an external pinion gear 22 that engages a rack 23 extending vertically along the path of the cage 10. A snap ring 24 holds the pinion 22 on the shaft 18. Thus, rotation of the pinion 22 as the cage 10 moves longitudinally causes rotation of the shaft 18 within the housing 14.

Figure 9:
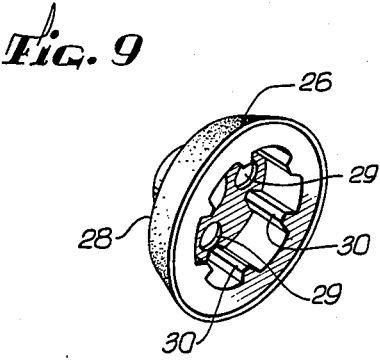
FIG. 9 is a perspective view of the bell member of the brake taken from the rear and showing the interior of the bell.

An interior conical surface of the housing 14 forms a first brake surface 25 configured to engage an opposing external conical brake surface 26 of an axially moveable bell member 28 disposed within the housing. Thus a forward axial force driving the bell 28 against the housing 14 causes firm frictional engagement of the two brake surfaces 25 and 26 at all times. Four evenly spaced apertures 29 in the bell member 28 permit convenient inspection of the interior of the brake 12 without full disassembly. A plurality of integrally formed lugs 30 are evenly spaced along the inner surface of the bell 28, as shown in FIG. 9.

Surrounding the shaft 18 inside the bell member 28 and locked to the shaft for rotation therewith by two separately formed spline members 31 disposed within grooves in the shaft is a carrier 32. A pair of snap rings 34 axially locate the carrier 32 on the shaft 18.

The carrier 32 defines two outwardly facing recesses or depressions in which first and second dogs 36 are disposed, each dog being a flat rectangular piece with a major surface that normally lies against the carrier. One end 38 of each dog 36 is rounded and is craddled within a concave portion 40 of the carrier 32 that defines part of the recess.

A pair of hooks 42 extend through the carrier 32 and through cross-wise openings 44 in the dogs 36. Each hook 42 is biased by a carrier spring 46 disposed within a bore 48 in the carrier 32 and retained on a shank of the hook by a nut 49 so that the spring resiliently pulls the dog inwardly against the carrier 32 and into the corresponding concave portion 40, as shown in FIG. 4. Upon compression of the carrier springs 46, which are coil springs that encircle the hooks 42, the dogs 36 can pivot on the concave portions 40 of the carrier 32 so that engagement ends 47 of the dogs move radially outwardly away from the carrier. The speed of rotation of the carrier 32 at which the dogs 36 move outwardly under centrifugal force can be adjusted by changing the positions of the nuts 49 and thus altering the spring tension on the hooks 42 or by replacing the springs 46. In addition to the resilient force of the springs 46, however, permanent magnets 50 at the engagement ends 47 of the dogs 36 resist this pivotal movement, being attracted to the metallic body of the carrier 32.

Also disposed within the housing 14 to the rear of the bell member 28 and encircling the carrier 32 is a pair of separation rings 52 and 54 that are concentric with the shaft 18 and the carrier. The rings each having an outer diameter equal to that of the bell member 28. The first ring 52, which is directly adjacent to the bell member 28, has a series of evenly spaced dependent lugs 56 that project radially inwardly to permit engagement by the dogs 36 in a manner explained below. In this regard the ring lugs 56 are similar to the bell member lugs 30.

Figure 6:
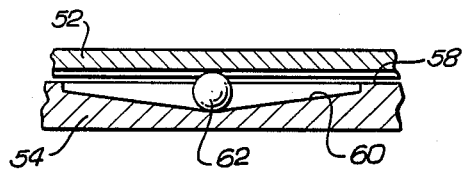
FIG. 6 is fragmentary, cross-sectional, side view of the ball and race mechanism taken along the line 6—6 of FIG. 5.

On the surface 58 of the second ring 54 that faces the first ring 52 are four evenly spaced arcuate races 60 (FIG. 5), the depth of each race being greater at the center and tapered so that it is reduced toward either end in a circumferential direction (FIG. 6). Disposed within each race 60 so that it is held between the two rings 52 and 54 is a ball 62, there being four such balls.

At the bottom of the second separation ring 54 projecting radially downwardly and away from the ring is a tab 64 secured to the circumferential edge of the ring by two screws 66, as shown in FIG. 4. The tab 64 is disposed between two closely spaced abutments 68 that are integrally formed with the housing 14, thereby limiting angular or rotational movement of the ring to the small displacement permitted by the positions of the abutments. When the brake 12 is in a non-actuated condition, the tab 64 is centered by the opposing forces of two small coil springs 70, each received by a bore in the tab and bearing against one of the abutments 68.

The lower end of the tab 64 beneath the abutments 68 is likewise normally centered between two electrical switches 72 secured to the housing 14, as shown in FIG. 4. Upon rotation of the second separation ring 54 to the extent permitted by the abutments 68, however, one of the two switches 72, as determined by the direction of rotation, will be operated by the tab 64. The switches 72 are thus used to detect the actuation of the brake 12, as explained below. The switches 72 can be of the latching or non-latching type, as desired.

When the brake 12 is in a non-actuated condition, the separation rings 52 and 54 and the bell member 28 are pressed together and the bell member 28 is resiliently urged away from the back plate 16 and into contact with the housing 14. The brake surface 26 of the bell member 28 thus frictionally engages the opposing brake surface 25 of the housing 14, as best shown in FIG. 3. No braking force is however applied to the shaft 18 because the shaft 18 is rotatably journaled within the bell member 28. A set of ball bearings 74 between the first separation ring 52 and the bell member 28 permits free relative rotation between these two members, also shown in FIG. 3.

Figure 8:
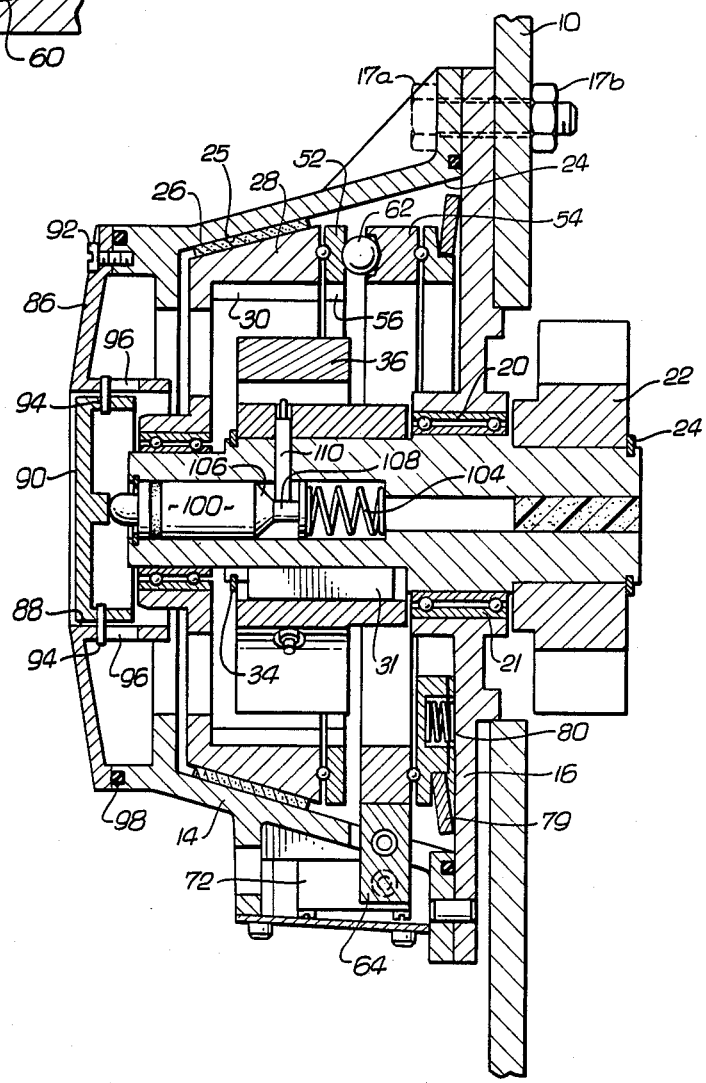
FIG. 8 is a cross-sectional, side view taken along the line 3—3 and similiar to FIG. 3 but showing the brake in an actuated condition.

The resilient force normally urging the separation rings 52 and 54 and the bell member 28 forwardly is applied by a pressure ring 76 disposed to the rear of the second separation ring 54, the pressure ring being about the same size as the separation rings, as best shown in FIGS. 1, 3 and 8. Part of this resilient spring force is supplied by a Belleville washer 78 disposed between the back plate 16 and the pressure ring 76. It is received by an annular cutaway portion 79 of the pressure ring 76 that extends inwardly from its outer periphery, as shown in FIGS. 3 and 8. The braking force can be adjusted to the circumstances by replacing the Belleville washer 78 with a heavier or lighter component.

An additional forwardly directed resilient force is attributable to four small coil springs 80. Each coil spring 80 is compressed between the back plate 16 and a spring perch 82 that extends from the inner periphery of the pressure ring 76, the springs being received by recesses in the spring perch. A set of ball bearings 84 permits the second separation ring 54 to turn freely relative to the pressure ring 76.

At the front of the brake 12 is a cover plate 86 having a large central aperture 88 in which a push button 90 is disposed. The cover 86 is secured to the housing 14 by four screws 92. The button 90 is axially movable within the cover 86 within limits defined by pins 94 carried by the button that project radially outwardly into slots 96 in a central structure of the cover 86, as best shown in FIGS. 3 and 8. A gasket 98 is held between the cover 86 and the housing 14.

When the button 90 is depressed, it pushes a plunger 100 further into an axial bore 102 in the shaft 18, thus compressing a spring 104 disposed within the bore to urge the plunger outwardly. Near the inner end of the plunger 100 is an inwardly tapered, conical cam surface 106 leading to a relatively small diameter cylindrical inner end section 108. With the plunger 100 moved outwardly within the cover 86 to the fullest extent permitted, two push rods 110 rest on the end section 108. These rods 110 are disposed within radial bores in the carrier 32 and the outer end of each rod normally rests against the inner surface of one of the dogs 36. Upon depression of the button 90, the cam surface 106 forces the rods 110 to move radially outwardly, pushing the two dogs 36 pivotally away from the carrier 32 in the same manner as that each of the dogs would be thrown outwardly by centrifugal force. Each rod 110 is formed by a cylindrical body 112 from which a pin 114 normally projects at its outer end. A spring 116 within the body 112 urges the pin 114 toward this extended position. In the event that the rod 110 is pushed outwardly by the plunger 100 at the same time that it is pushed inwardly by one of the lugs 56, the spring 116 is compressed as the pin moves telescopically into the body 112, thus reducing the overall length of the rod and avoiding damage to the device.

The operation of the brake 12 will now be explained, first with respect to its self-actuation in response to an overspeed condition. As the cage 10 moves linearly, the pinion 22 causes rotation of the shaft 18 and the carrier 32. At a predetermined speed, the centrifugal force level at the engagement end 47 of one of the dogs 36 overcomes the holding force of the corresponding magnet 50 and the resilient force of the corresponding holding spring 46, the magnetic force being the greater of the two. Once the magnet 50 breaks contact with the carrier 32, the force of magnetic attraction diminishes rapidly and the dog 36 pivots quickly on its rounded end 38 until its engagement end 47 strikes the surrounding first separation ring 52 and the bell member 28.

It should be noted that the direction of rotation of the carrier 32 determines which of the two dogs 36 will brake away first. With reference to FIG. 7, the dog 36 shown on the right-hand side has swung out in response to a counter-clockwise rotation of the carrier 32. Counter-clockwise rotation would also tend to cause the rounded end 38 of the other dog 36 to fly out, but in that case the end that would move is restrained by a higher force from the holding spring 46 (which is closer to that end) and is cradled by the concave portion 40 of the carrier 32 in such a way that radial movement is inhibited. Accordingly, one of the two dogs 36 moves outwardly first in response to rapid downward movement of the cage 10 and the other dog moves outwardly first in response to rapid upward movement of the cage.

Once a dog 36 has moved outwardly, contacting the inner periphery of the first separation ring 52 and the inner surface of the bell member 28, it rides along the curvature of those members until it engages one of the bell member lugs 30 and one of the ring lugs 56. Because there are eight evenly spaced lugs 56, the maximum delay that can take place before the dog 36 engages one of these lugs is minimal. The first separation ring 52 and the bell member 28 are then forced by the dog 36 to rotate with the shaft 18. Meanwhile the second separation ring 54 remains locked against the housing 14 by the tab 64.

When relative rotation occurs between the two separation rings 52 and 54, the balls 62 move with a rolling action toward the ends of their respective races 60, thus forcing axial separation of the rings. The balls 62 and races 60 thus act as a separator.

Axial separation of the separation rings 52 and 54 forces compression of the coil springs 80 between the pressure ring 76 and the back plate 16, as shown in FIG. 8, and the Belleville washer 78 is flattened in the same manner. The bell member 28 is resiliently urged axially forward into firmer and firmer contact with the housing 14, bringing the brake surfaces 25 and 26 into tighter frictional engagement to halt rotation of the shaft 18 and thereby smoothly stopping the cage 10. There is no delay in initiating the braking force once the lugs 30 and 56 are contacted by the dogs 36 because the brake surfaces 25 and 26 are already in contact with each other, although the initial axial force urging them together is moderate. Because the brake surfaces 25 and 26 are conical, the braking force is increased gradually as the surfaces come together and the surfaces remain in alignment as they wear. Conical brake surfaces also generate large brake forces in comparison to their size.

Actuation of the brake 12 will cause the second separation ring 54 to rotate slightly as far as permitted by the tab 64, thus throwing one of the switches 72 to stop the hoist motor (not shown). The brake 12 then remains in its actuated condition, as shown in FIG. 7, until the motor is reversed. Once the motor is reversed, however, and the actuated dog 36 is disengaged from the lug 30 and 56, the corresponding spring 46 pulls the dog back against the carrier 32. Since the dog 36 does not engage a high friction brake surface, it is readily disengaged.

The brake 12 can also be operated manually, overriding its automatic features, by pressing the button 90 and thereby forcing both dogs 36 to move outwardly. One of the two dogs 36, as determined by the direction of rotation, will engage one of the bell member lugs 30 and one of the ring lugs 56 in the manner described above. The other dog will be pushed back toward the carrier 32 by the lugs 56 and will be pulled inwardly by the corresponding spring 46 until the field of the corresponding magnet 50 takes effect again. The motor is then de-energized by one of the switches 72 in the same way as in the case of automatic actuation. The brake 12 is released or deactuated by simply reversing the motor.

It will be apparent from the foregoing that the brake of the present invention is highly reliable and of relatively simple, rugged construction. It is also bi-directional and capable of either automatic or manual actuation.

While a particular form of the invention has been illustrated and described, it will also be apparent that various modifications can be made without departing from the spirit and scope of the invention.

I claim:

1. An overspeed brake for arresting longitudinal movement comprising:
   a shaft;
   drive means for causing said shaft to rotate at a speed proportional to longitudinal movement;
   a carrier connected to said shaft for rotation therewith;
   a dog mounted on said carrier and outwardly moveable with respect to said carrier in response to centrifugal force;
   restraining means for resisting centrifugal force and thereby releasably holding said dog inwardly toward said carrier as said carrier rotates until a predetermined centrifugal force level is reached, said restraining means including at least one dog spring urging said dog toward said carrier and magnetic means for magnetically holding said dog inwardly against said carrier;
   first and second separation rings;

spreader means for axially separating said rings in response to relative rotational motion between said rings, said spreader means comprising at least one race extending circumferentially between said separation rings and tapered in a circumferential direction, and a ball disposed within said race;

means for preventing rotation of said first ring;

rotation means for causing rotation of said second ring upon engagement thereof in response to outward movement by said dog; and actuation means including first and second opposing friction surfaces for applying a brake force to stop rotation of said shaft in response to separation of said rings.

2. The apparatus of claim 1 wherein one of said friction surfaces is defined by a housing in which said carrier and said separation rings are enclosed.

3. The apparatus of claim 1 further comprising a second dog mounted on said carrier, both of said dogs being pivotably moveable in opposite directions with respect to said carrier, and both of said dogs being engageable with said rotation means, whereby said apparatus is rendered bi-directional.

4. The apparatus of claim 1 further comprising means for locking one of said friction surfaces to said shaft for rotation therewith in response to movement of said dog.

5. The apparatus of claim 1 wherein the holding force of said magnetic means exceeds the force of said dog spring.

6. The apparatus claims 1 further comprising manually operable override means for forcing said dog to move outwardly away from said carrier to engage said rotation means.

7. The apparatus of claim 6 wherein said override means comprises a radially moveable rod and an axially moveable plunger.

8. The apparatus of claim 7 wherein said plunger is axially aligned with said shaft.

9. A manually operable overspeed brake for arresting longitudinal movement of an elevator cage on which it is mounted comprising:

a shaft;

a pinion mounted on said shaft for rotation therewith;

a rack engaged by said pinion to cause rotation of said shaft at a speed proportional to longitudinal movement of said cage along said rack;

a carrier mounted on said shaft for rotation therewith, said carrier defining a pair of recesses;

first and second dogs each cradled by one of said recesses and pivotably moveable with respect to said carrier;

first and second dog springs urging said dogs toward said carrier;

magnetic means for magnetically holding said dogs inwardly against said carrier as said carrier rotates until a predetermined centrifugal force level is reached;

first and second opposing separation rings concentric with said carrier and said shaft;

a plurality of circumferentially tapered races defined by at least one of said rings and disposed between said rings;

balls disposed within said races to force said rings apart axially in response to relative rotation between said rings;

a plurality of lugs extending inwardly from one of said rings, whereby engagement of one of said lugs by one of said dogs causes relative rotation between said rings;

a housing enclosing said carrier and said rings and having a conical interior first brake surface thereon;

a bell member axially moveable within said housing and defining a second conical brake surface arranged to frictionally engage said first brake surface;

resilient means for causing engagement of said brake surfaces at all times;

means for locking said bell member to said shaft for rotation therewith in response to pivotal movement of one of said dogs; and manually actuable override means comprising a pair of radially moveable rods each engageable with one of said dogs and an axially moveable plunger engageable with said rods for forcing said dogs to move outwardly away from said carrier to engage one of said lugs.

10. The apparatus of claim 9 wherein the holding force of said magnetic means exceeds the force of said dog springs.

11. An overspeed brake for arresting longitudinal movement comprising:

a shaft;

drive means for causing said shaft to rotate at a speed proportional to longitudinal movement;

a carrier connected to said shaft for rotation therewith;

a dog mounted on said carrier and outwardly moveable with respect to said carrier in response to centrifugal force;

restraining means for resisting centrifugal force and thereby releasably holding said dog inwardly toward said carrier as said carrier rotates until a predetermined centrifugal force level is reached, said restraining means including at least one dog spring urging said dog toward said carrier and magnetic means for magnetically holding said dog inwardly against said carrier;

first and second separation rings concentric with said shaft;

spreader means for axially separating said rings in response to relative rotational motion between said rings;

rotation means for causing rotation of one of said rings upon engagement thereof by said dog in response to outward movement by said dog;

actuation means including first and second opposing friction surfaces for locking one of said friction surfaces to said shaft for rotation therewith in response to said outward movement of said dog and for applying a brake force to stop rotation of said shaft in response to separation of said rings; and manually operable override means for forcing said dogs to move to engage said rotation means.

12. The apparatus of claim 11 wherein said override means comprises a radially moveable rod and an axially moveable plunger.

* * * * *